United States Patent
Bhan et al.

(10) Patent No.: US 8,655,672 B2
(45) Date of Patent: Feb. 18, 2014

(54) TARGETED INVITATION DELIVERY

(75) Inventors: Sundeep Bhan, New York, NY (US);
Jeff Fenigstein, New York, NY (US);
John Alfano, Farmingdale, NY (US)

(73) Assignee: WebMD, LLC, New York, NY (US)

( * ) Notice: Subject to any disclaimer, the term of this patent is extended or adjusted under 35 U.S.C. 154(b) by 642 days.

(21) Appl. No.: 10/734,811

(22) Filed: Dec. 11, 2003

(65) Prior Publication Data
US 2004/0210451 A1    Oct. 21, 2004

Related U.S. Application Data

(60) Provisional application No. 60/432,873, filed on Dec. 11, 2002.

(51) Int. Cl.
*G06Q 30/02* (2012.01)
*G06Q 10/10* (2012.01)
*G06Q 30/06* (2012.01)
*G06Q 10/06* (2012.01)
*G06Q 10/08* (2012.01)

(52) U.S. Cl.
USPC .......................................................... 705/1.1

(58) Field of Classification Search
USPC ...................................... 705/1, 1.1
See application file for complete search history.

(56) References Cited

U.S. PATENT DOCUMENTS

| 2002/0138325 A1* | 9/2002 | Mashimo et al. ................. 705/8 |
| 2004/0088362 A1* | 5/2004 | Curbow et al. ................ 709/207 |
| 2005/0004983 A1* | 1/2005 | Boyd ............................ 709/204 |

FOREIGN PATENT DOCUMENTS

| WO | WO 200152106 A2 * | 7/2001 | ............. G06F 17/30 |
| WO | WO 200169483 A2 * | 9/2001 | ............. G06F 00/00 |

* cited by examiner

*Primary Examiner* — Jonathan Ouellette
(74) *Attorney, Agent, or Firm* — Wilmer Cutler Pickering Hale and Dorr LLP

(57) ABSTRACT

Data about a plurality of events is stored in an event database, including information for selecting who should be invited to the event. Data about a plurality of members is stored in a member database, preferably including members' preference criteria specifying the type of events in which each member likes to participate. The member information is matched against the invitee selection criteria and the event information is matched against the member preference criteria to determine which members should be invited to each event. Based on results of this matching process, e-mail invitations to the selected events are sent to the members.

11 Claims, 6 Drawing Sheets

EVENTS

| event no. | topic | speaker | date | location | sponsor | incentive | recruitment info |
|---|---|---|---|---|---|---|---|
| 1 | preventing heart attacks | Dr. Alan Abrams | Mar. 11, 2004, 8AM | New York, NY | ABC Co. | none | cardiologists |
| 2 | tendonitis | Dr. Ben Baden | Mar. 11, 2004 9AM | Trenton, NJ | DEF Co. | 1 hour CME credit | radiologists |
| 3 | cervical cancer | Dr. Charles Cadence | Mar. 12, 2004, 1PM | Web broadcast | GHI Co. | medical dictionary | Dr. Rosa Roberts Dr. Steven Samuels Dr. Travis Torrance |
| 4 | osteoporosis | Dr. Dan Dartmouth | Mar. 12, 2004, 9AM | Yonkers, NY | GHI Co. | $75 Medsite rewards | orthopedics Dr. Peter Perch |
| 5 | osteoporosis | Dr. Edwin Erie | Mar. 13 2004, 10AM | New York, NY | ABC Co. | none | orthopedics |

FIG. 2

MEMBERS

| member no. | name | specialty | contact info | ME # | email frequency | interests |
|---|---|---|---|---|---|---|
| 1 | Dr. Peter Perch | radiology | 1 Fifth Ave New York, NY | 11111 | daily | tendonitis |
| 2 | Dr. Rosa Roberts | cardiology | 12 Second Ave. New York, NY | 22222 | weekly, Monday at 1 PM | all |
| 3 | Dr. Steven Samuels | gastro-enterology | 20 East 34th St. Trenton, NJ | 33333 | weekly | all |
| 4 | Dr. Travis Torrance | internist | 7 Sycamore Ln. Scarsdale NY | 44444 | daily at 8 AM | all |
| 5 | Dr. Victor Volpe | orthopedics | 99 Poplar Dr. Bangor, ME | 55555 | every two weeks | ABC Co. |

FIG. 3

MATCHES

| member no. | invite to event nos. |
|---|---|
| 1 | 2 (ref. a) 4 (ref. b) |
| 2 | 1 (ref. c) 3 (ref. d) |
| 3 | 3 (ref. e) |
| 4 | 3 (ref. f) |
| 5 | 4 (ref. g) 5 (ref. h) |

FIG. 4A

| INVITATIONS | | | | | |
|---|---|---|---|---|---|
| invitation ref. code | member no. | event no. | queued | emailed | response |
| a | 1 | 2 | yes | yes | none |
| b | 1 | 4 | yes | yes | none |
| c | 2 | 1 | yes | yes | accepted |
| d | 2 | 3 | yes | yes | declined |
| e | 3 | 3 | yes | yes | deleted |
| f | 4 | 3 | yes | no | N/A |
| g | 5 | 4 | yes | no | N/A |
| h | 5 | 5 | yes | no | N/A |

FIG. 5

| MATCHES | |
|---|---|
| member no. | invite to event nos. |
| 1 | 2 (ref. a) <br> 4 (ref. b) |
| 2 | 1 (ref. c) <br> 3 (ref. d) |
| 3 | 3 (ref. e) |
| 4 | 3 (ref. f) |
| 5 | 4 (ref. g) <br> 5 (ref. h) |

FIG. 4B

SAMPLE EMAIL

From: Medsite Invites  
To: Dr. Rosa Roberts  
Subject: Invitations to Events that Match Your Criteria  
Sent: Mon 12/8/2003, 1:00 PM Dr. Roberts: You are invited to attend the following events:

| topic | speaker | date and time | location | incentive | response |
|---|---|---|---|---|---|
| preventing heart attacks | Dr. Alan Abrams | Mar. 11, 2004 8:00 AM | New York, NY | none | ☐ accept<br>☐ decline<br>☐ delete |
| cervical cancer | Dr. Charles Cadence | Mar. 12, 2004 1:00 PM | Web broadcast | medical dictionary | ☐ accept<br>☐ decline<br>☐ delete |

SUBMIT

Click on any of the underlined hyperlinks above for more information.  
You may RSVP by filling in the check boxes and clicking submit button, or by visiting our website at www.Medsite.com.

FIG. 6

Therapeutic Areas

Select the therapeutic areas for which you would like to receive invitations.

☐ Deselect All

☑ Allergies & Asthma  ☑ Genitourinary Disease
☑ Arthritis & Acute Pain  ☑ Infectious Disease
☑ Cardiovascular Disease  ☑ Metabolic Disorders (incl. Diabetes)
☑ CNS & Psychiatric Disorders  ☑ Oncology
☑ Dentistry  ☑ Ophthalmology
☑ Dermatology  ☑ Respiratory Diseases
☑ Gastrointestinal Disease

Event Types

Select the event types for which you would like to receive invitations.

☑ Advisory Board Meetings  ☑ Market Research (Surveys, etc...)
☑ Clinical Advisory Panels  ☑ Round Tables
☑ Clinical Investigator Meetings (Clinical Trials)  ☑ Speaker Training Sessions
☑ Consultative Meetings  ☑ Symposiums
☑ Continuing Medical Education (CME)  ☑ Teleconferences
☑ Dinner Meetings  ☑ Video Conferences
☑ Grand Rounds  ☑ Website Launches
☑ Interactive Online Learning Programs

FIG. 7

| home | my account | help |

Search [_____] [Go] Advanced Search

Inbox

Welcome Alex Carter. You have 0 unopened invitations in your Inbox.

| | Accept | Decline | Delete | Sort By ▼ | Sort Order ▼ | | Page 1 of 1 |

| From | Topic | Incentive | Received |
|---|---|---|---|
| ☐ CuresAll | Panacea - New Dosage Information<br>Event Type: Teleconferences<br>Date: Ongoing<br>Location: Online<br>Status: Accepted - Click here to Attend | $100 Certificate | August 19, 2003 |
| ☐ CuresAll | Free CME in Psychiatry<br>Event Type: CME (Online)<br>Date: Ongoing<br>Location: Online<br>Status: Accepted - Click here to Attend | 1 CME Credit | August 19, 2003 |
| ☐ CuresAll | *Cure Rx* Interactive Learning<br>Event Type: Online Drug, Device, or Diagnostic Education<br>Date: Ongoing<br>Location: Online<br>Status: Accepted - Click here to Attend | Samples | August 19, 2003 |

| Accept | Decline | Delete | Page 1 of 1 |

FIG. 8

TARGETED INVITATION DELIVERY

CROSS REFERENCE TO RELATED APPLICATIONS

Priority is claimed to U.S. provisional application No. 60/432,873, filed Dec. 11, 2002, which is incorporated herein by reference.

BACKGROUND

The present invention relates to the distribution of invitations for a plurality of events.

In many fields, particularly among practitioners such as doctors, companies and institutions that wish to disseminate information about their products sponsor events to promote those products. These events are typically promoted to members of the target practitioners. For example, in the medical field, drug companies that wish to promote a new drug may run such a symposium where a speaker presents a paper about the benefits of the drug to a group of doctors. Other examples in the medical field include CME events, dinner meetings, webcasts, and teleconferences.

In fields with a large number of practitioners and a large number of products, it can be difficult for the sponsors to get information about such events to the relevant target audience, especially since conventional approaches such as cold calling and spam emails can be perceived as a nuisance by their recipients. In addition, it can be difficult for the practitioners to keep abreast of events that they would like to participate in.

SUMMARY OF THE INVENTION

The present invention facilitates distribution of invitations for a plurality of events to a desired sub-population of practitioners within a field. In some embodiments, recipients can specify what type of information they are interested in receiving.

BRIEF DESCRIPTION OF THE DRAWINGS

FIG. 2 is an example of a data structure for storing information about a plurality of events.

FIG. 3 is an example of a data structure for storing information about a plurality of members.

FIG. 4A is a table that depicts matches between the members and the events.

FIG. 4B is a table that depicts matches between the members and the events, adjusted to account for members' preferences.

FIG. 5 is a data structure for tracking the status of issued invitations.

FIG. 6 is a sample of an e-mail invitation inviting a particular member to a selection of events.

FIG. 7 is a sample screen where members can specify their preferences.

FIG. 8 is a sample screen for a web-based display of a member's invitations.

DETAILED DESCRIPTION OF THE PREFERRED EMBODIMENTS

Figure 1:
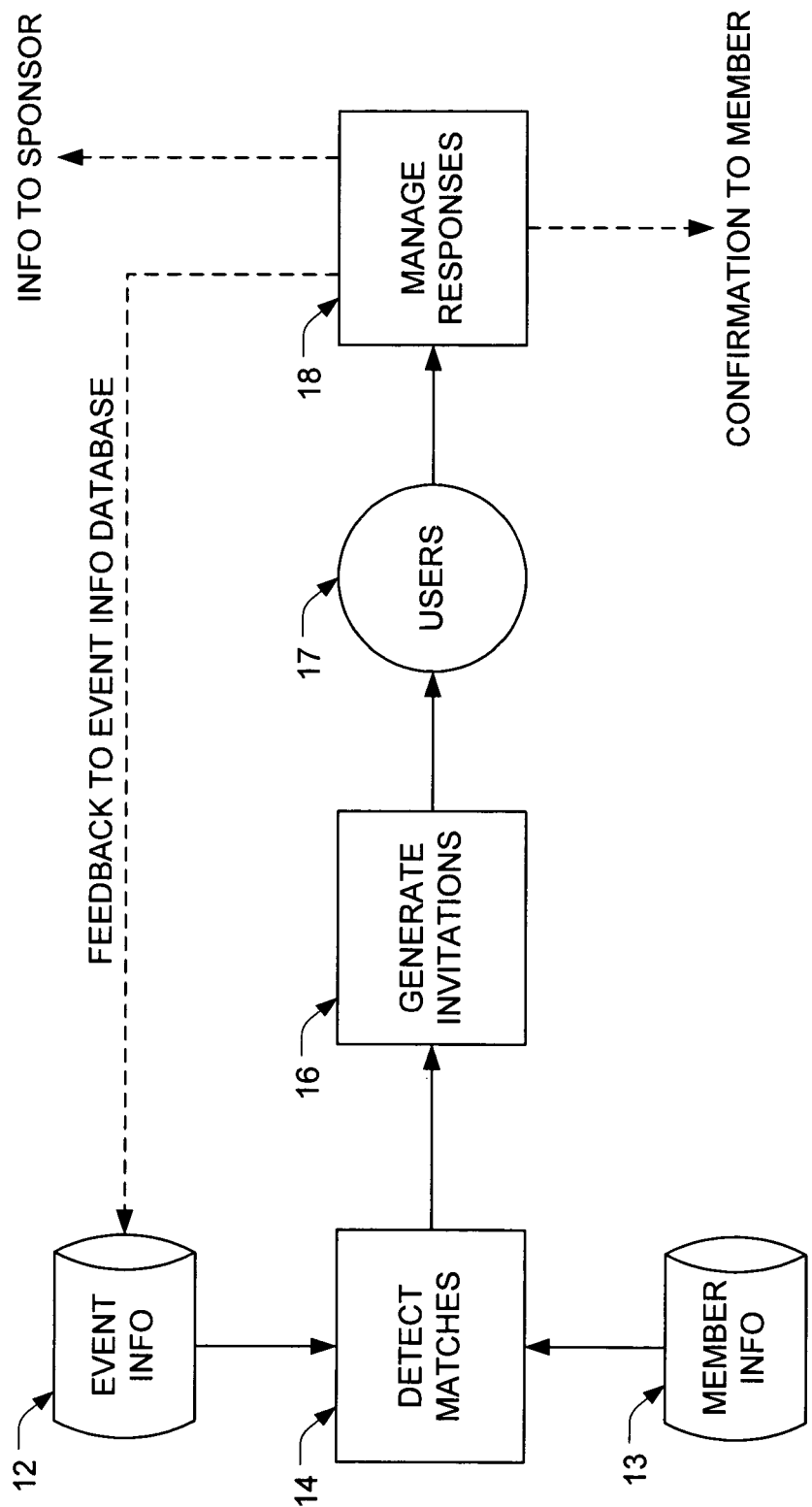
FIG. 1 is an overall block diagram of an embodiment of the invention.

The embodiments described herein preferably are implemented using a central Internet-based server. Conventional computer hardware (e.g., Windows, McIntosh, and Linux-based machines) communicate with the central server via the Internet, Internet-based e-mail and/or alternate communication mechanisms. The hardware and software for implementing these servers and computers, as well as the mechanism for their communication is well known to persons skilled in the relevant arts. Accordingly, this application focuses on the data structures that are implemented in the server, and the communication between the server and the members (i.e., the users). It is envisioned that instructions for performing the process steps described herein will be stored on computer-readable media (e.g., optical, magnetic, or semiconductor media), in any conventional manner.

FIG. 1 is an overall block diagram of an embodiment of the invention. The illustrated embodiment contains an event information database 12 which is populated based on information received from sponsors of the event. In some embodiments, the event database 12 is managed by a system administrator who receives information from the sponsors of the events. In alternative embodiments, particularly with sponsors that run a large number of events, the system may permit the sponsors to create new entries in the event database 12 themselves. In such case, suitable communications between the event database 12 and the sponsors' remote computers (both not shown) are preferably implemented using any conventional communication protocol.

The illustrated embodiment also includes a member information database 13. This member database 13 includes information about the people who are to receive the invitations that are generated by the system. The member database 13 may initially be populated by importing information from another database in the relevant field. For example, if the system is used to deliver invitations to medical doctors, a preexisting database of medical doctors could be used to pre-populate the member database 13. In some embodiments, a mechanism is provided by which a new user can register and add his or her information into the member database 13, preferably via a conventional web-based interface (not shown).

FIG. 2 is an illustrative example of an appropriate set of fields for the event database 12. This database preferably includes information that describes each event (such as the topic, the speaker, the data and time, the location, and the sponsor). If an incentive is offered to attendees of the event, that incentive is also included in the event database. The fields that describe the events may include, for example, an event ID, topic, speaker name, description, event type, location, time(s), date(s), RSVP date, RSVP phone number, an event URL, and eligible attendees (i.e. MD, PA, RN, etc.). Fields to describe each event's sponsor may also be included, such as the company name, a drug name, and a drug category.

The event database preferably also includes recruitment information (also referred herein as invitee selection criteria) which specifies characteristics of desired target audience. Those characteristics could include generalized information such as the recipient's specialty, or particular information that identifies specific individuals that are to be invited. Examples of fields that are suited for invitee-selection include, for example, Customer ID, First Name, Last Name, Degree, Address, City, State, Zip Code, Phone Number, Fax Number, Email Address, Specialty, ME Number, and DEA Number.

FIG. 3 is an illustrative example of an appropriate set of fields for the member database 13. The illustrated member database includes all the information that the Detect Matches process 14 (shown in FIG. 1) needs in order to implement sponsor-directed matching. This information may include, for example, the name and specialty of each member as well as contact information and a unique identifier number such as the ME number.

Once the event database 12 and the member database 13 have been populated, the Detect Matches process 14 examines the contents of the two databases 12, 13 and determines which of the events match which of the members.

Matching may be implemented automatically by comparing the topic of each event (which appears in the event database 12) to the specialty of each member (which appears in the member database 13), and searching for matches between events and members. For example, a member database for doctors might include each doctor's specialization (e.g., cardiology, orthopedics, pediatrics), and the event information in the event database 12 would contain fields that match those specialties. The Detect Matches process 14 would compare the appropriate fields in the event database 12 and the member database 13 to find matches. For example, the Detect Matches process 14 might match a pediatric cardiology event to pediatricians and cardiologists, but would not match that event with a member whose specialty is oncology.

Matching may also be implemented based on sponsor-directed invitee-selection criteria, which permits event sponsors to target promotion of their events to their desired audience. This may be accomplished, for example, by providing appropriate fields in the event database 12, and searching for matches for those fields in the member database 13. The fields are preferably populated using any conventional user interface (e.g., a web-based interface). Examples of such fields could include an area of specialization (e.g., cardiology, orthopedics, etc.), to permit promotion of an event to all interested members with that specialization. See, for example, event #1 in FIG. 2, which specifies a specialty (orthopedics).

Events may also be promoted to specific individuals by specifically listing those individuals that the sponsor would like to invite to the event. This approach may be implemented, for example, by providing fields in the event database 12 for listing individual names of the desired recipients (or another unique identifier such as an e-mail address or a license number). See, for example, event #3 in FIG. 2, which specifies three names. In still other embodiments, category-based invitee-selection criteria may be combined with individual invitee-selection criteria by using some fields in the event database 12 to specify a specialty, and using other fields in the event database 12 to specify individual recipients. See, for example, event #4 in FIG. 2, which specifies both a specialty (orthopedics) and an individual's name.

Matching may also be implemented based on the preferences of the members. In these embodiments, the members enter the type of events that they would like to hear about in an appropriate field in the member database 13. The Detect Matches process 14 compares the values entered into those fields with corresponding fields in the event database 12 and designates those events with corresponding criteria as matching. See, for example, member #1 in FIG. 3, which specifies both tendonitis as an area of interest.

Thus, three alternatives exist: In the first alternative, the Detect Matches process 14 may be configured to flag matches based only on the selection criteria contained in the event database 12, and comparisons of those criteria to information contained in the member database 13. In the second alternative, the Detect Matches process 14 may be configured to flag matches based only on the members' preferences contained in the member database 13, and comparisons of those preferences to information contained in the event database 13.

In the third alternative, the Detect Matches process 14 is configured to flag matches based on both (a) the selection criteria contained in the event database 12 and comparisons of those criteria to information contained in the member database 13; and (b) the members' preferences contained in the member database 13 and comparisons of those preferences to information contained in the event database 13. With the third alternative, any invitation that is received by a member would satisfy two conditions: the event's sponsor wants the invitation delivered to the member, and the member is also interested in receiving that particular type of invitation.

FIG. 4A is an example of the matches that are obtained when the first alternative is used (i.e., when the sponsor's criteria contained in the event database illustrated in FIG. 2 is compared to the information in the member database illustrated in FIG. 3). In this example, member no. 1 matched the criteria for event nos. 2 and 4; member no. 2 matched the criteria for event nos. 1 and 3; member no. 3 matched the criteria for event no. 3; member no. 4 matched the criteria for event no. 3, and member no. 5 matched the criteria for event nos. 4 and 5. All these matches are listed in FIG. 4A.

FIG. 4B illustrates what the match table would look like when the third alternative is used (i.e., when member preferences are used in addition to sponsor's invitee selection criteria). Note that while either set of criteria could theoretically be applied first, the example of FIG. 4B assumes that the sponsor's criteria is applied first. As explained above, the results of the sponsor's invitee selection criteria for the data shown in FIGS. 2 and 3 is the set of matches that appear in FIG. 4A. The matches from FIG. 4A are then used as the starting point for the next selection step, which is based on the members' preferences.

For the example data shown in FIG. 3, member numbers 2-4 have not specified any interests, so the system assumes the default condition that those members are willing to accept invitations relating to all areas of interest. Accordingly, the events that were previously selected for member numbers 1-3 are not changed, as shown in FIG. 4B.

FIG. 4A contained two events for member number 1 (i.e., event nos. 2 and 4). However, because member number 1 has specified that he is only interested in tendonitis, the system recognizes that member number 1 is not interested in event number 4, which relates to osteoporosis. As such, only event number 2 (which relates to tendonitis), remains in FIG. 4B for member number 1. Similarly, because member number 5 indicated that he is interested in the products of ABC Co., but did not indicate an interest in the products of GHI Co., only event number 5 (which relates to ABC), remains in FIG. 4B for member number 4.

Once a set of matches is obtained as described above (as reflected in FIG. 4A for sponsor-directed matches, or FIG. 4B when both a sponsor-directed and member-directed matches), the Generate Invitations process 16 (shown in FIG. 1) is implemented. This process queues up all the invitations that are to be delivered to each member based on the results of the Detect Matches process 14.

The member database (shown in FIG. 3) preferably includes a field entitled "E-mail frequency" which allows a member to specify how often he would like to be contacted with invitations, and a preferred time of day or day of the week. For example, one member may specify that he would like to receive emails daily at 8 AM, and a second member may specify that she would like to receive emails every Monday at noon. When the preferred reception time arrives for a given member, all of the invitations that are queued up for that member are formatted into an e-mail, and the e-mail is delivered to the member 17 (shown in FIG. 1).

FIG. 6 is an example of such an e-mail for member number 2. The e-mail contains two invitations: one for each of the events that appear on the match table for member number 2. Preferably, the user may obtain details about any of the listed events by clicking on the corresponding link in the email. When member number 2 receives the e-mail, the member is provided with the option to accept, decline, or delete each of the invitations. Although any suitable user interface may be used for this purpose, as will be appreciated by those skilled in the relevant art, the illustrated example includes check boxes that the member clicks to make their selections.

After the member has made their selections, the member clicks on the submit button which submits the member's responses to the central server via the internet. In an alternative embodiment, members may log into their account via the Internet, and access their invitations using a suitable web-based interface. FIG. 8 is a sample web-based screen for listing a member's invitations and reporting the status of those invitations (e.g., accepted, declined, etc.) to the member. With either embodiment, the central server then implements the Manage Responses process 18 to deal with the members' responses.

Preferably, response to the e-mail will direct the member's browser's to a website that manages the members' responses. Access to this website may be protected using conventional mechanisms such as password protection. On the website, members may be provided with the option to filter, sort, search, accept, decline, and/or delete all their invitations, using any appropriate user interface.

Optionally, the system may be programmed to track accepted invitations and send a reminder e-mail at a predetermined time before the event (e.g., one day for live events, or one-half hour for webcast events).

Optionally, members' responses may be reported to the sponsors to help the sponsors manage attendance at their events. Certain responses may call for updating of the event information. For example, when an in-person event only has room for a limited number of participants, the event can be marked "closed" after the maximum number of participants have registered for the event (and optionally removed from all queues). Optionally, if a sponsor recognizes that one of their events is not receiving sufficient interest, facilities for updating the event's description (e.g., by modifying the title) or the invitee-selection criteria (e.g., to broaden the target audience) may be provided. New emails would then be queued after the update has occurred.

Optionally, appropriate feedback may be returned to the member by the Manage Responses process 18 (e.g., by sending a confirmatory e-mail to the member to indicate that registration for an event has been successful).

FIG. 5 is an example of a data structure that may be used by the Generate Invitations process 16 to track the issuance of invitations, and by the Manage Responses process 18 to track the members' responses. The data shown in FIG. 5 reflects the status of each of the eight invitations at a snapshot in time. More specifically, this snapshot in time occurs after all of the matches have been queued for invitation a-h, but the preferred e-mail reception time has only passed for member number 1-3. As a result, only invitations a-e have been e-mailed (indicated by the entry "yes" in the "emailed" column). In contrast, because the preferred e-mail reception time for member numbers 4 and 5 has not yet occurred, invitations f-h have not yet been mailed to member numbers 4 and 5.

On the response, side, at the snapshot of time represented in FIG. 5, member number 1 has not yet responded to his invitations (i.e., the invitations with reference codes a and b), so the word "none" appears in the response column for those invitations. Member numbers 2 and 3, on the other hand, have already responded to invitation numbers c-e, and those responses are reflected in the right-hand column of FIG. 5. Since member nos. 4 and 5 have not yet received their invitations (because their preferred delivery time has not yet arrived), the response column is not applicable to them.

The above-described embodiments are advantageous to sponsors, because it enables them to target their events to those recipients that they find most desirable. They are also advantageous to the members, because the members can tailor the events to which they are invited by entering their preferences using, for example, a conventional web interface. An example of a web-based data entry screen that members can use to input their preferences is shown in FIG. 7. This information is ultimately transferred into the member database 13, shown in FIG. 1.

This arrangement is convenient for members, because all of their invitations are consolidated from multiple sponsors into a single place. In addition, the members do not have to sift through mountains of spam to find events in which they are interested. Because of these advantages to the member, it is expected that members will make use of the service. This, in turn, increases the system's usefulness to sponsors, because it helps the sponsors get their invitations in front of their target audiences.

While the present invention has been explained in the context of the preferred embodiments described above, various changes may be made to those embodiments and various equivalents may be substituted without departing from the scope of the invention, as will be apparent to persons skilled in the relevant art. For example, a similar system could be used to market other products and services besides the "events" discussed above. One example would be to use a similar system to disseminate samples of drugs to the appropriate recipients. Other examples, both in and outside the medical field, can also make use of similar systems. In such cases, the sponsors would use selection criteria to select their target audience, and the audience would use member preferences to select the offers that they would like to receive. The matching of which offer is to be directed to which member, however, would be implemented using similar principles.

We claim:

1. A computer-implemented method of selectively distributing invitations for a plurality of events, the method comprising:

electronically storing in an event information database (a) a plurality of event records, each event record storing event information for a corresponding different event of a plurality of events, and (b) feedback information based on tracking of a plurality of member responses to invitations, wherein the event information stored in each of the plurality of event records includes one or more corresponding invitee selection criteria;

electronically storing in a member information database member information for each of a plurality of members, wherein each of the plurality of members has a corresponding electronic mailbox for receiving electronic communications for storage and later retrieval by that member;

for each event of the plurality of events, analyzing in a computer system the stored event information obtained from the event information database for that event, the stored feedback information obtained from the event information database, and the stored member information obtained from the member information database to identify, for each member among the plurality of members, targeted events among the plurality of events;

electronically storing for each member information about the targeted events; and based on the stored information about the targeted events, generating and sending an electronic invitation message to the electronic mailbox of each member of the plurality of members for which targeted events were identified, wherein each electronic invitation message invites its corresponding recipient to all of the targeted events which were identified for that corresponding recipient.

2. The method of claim 1, wherein the one or more corresponding invitee selection criteria comprises an area of practice.

3. The method of claim 1, wherein the one or more corresponding invitee selection criteria for each of the plurality of events is selected by a sponsor of the respective event.

4. The method of claim 1, wherein the one or more corresponding invitee selection criteria comprises an identifier that uniquely identifies an individual member.

5. The method of claim 1, wherein the one or more corresponding invitee selection criteria comprises a list of identifiers, each of which uniquely identifies an individual member.

6. A computer-implemented method of selectively distributing invitations for a plurality of events, the method comprising:

electronically storing in an event information database (a) a plurality of event records, each event record storing event information for a corresponding different event of a plurality of events, and (b) feedback information based on tracking of a plurality of member responses to invitations, wherein the event information stored in each of the plurality of event records includes one or more corresponding invitee selection criteria;

electronically storing in a member information database member information for each of a plurality of members, wherein each of the plurality of members has a corresponding electronic mailbox for receiving electronic communications for storage and later retrieval and wherein the member information for each of the plurality of members includes one or more member preferences;

for each event of the plurality of events, analyzing in a computer system the stored event information obtained from the event information database for that event, the stored feedback information obtained from the event information database, and the stored member information obtained from the member information database to determine, for each member among the plurality of members, all events among the plurality of events to which that member should be invited based on at least one of (a) matches between the member information and the one or more corresponding invitee selection criteria for each of the plurality of events, (b) matches between the event information and the one or more member preferences for the respective members, and (c) the stored feedback information;

electronically storing, for each member, invitation information indicating which events among the plurality of events each of the plurality of members should receive an invitation to; and based on the stored invitation information, generating and sending an electronic invitation message to the electronic mailbox of each member of the plurality of members identified in the stored invitation information for receiving an invitation, wherein each electronic invitation message invites its corresponding recipient to all of the events determined for that recipient in the invitation information.

7. The method of claim 6, wherein, in the comparing step, a decision to invite a given member to a given event requires (a) a match between the member information for the given member and the at least one invitee selection criterion for the given event and (b) a match between the event information for the given event and the member preference for the given member.

8. The method of claim 6, wherein the at least one invitee selection criterion comprises an area of practice.

9. The method of claim 6, wherein the at least one invitee selection criterion for each of the plurality of events is selected by a sponsor of the respective event.

10. The method of claim 6, wherein the at least one invitee selection criterion comprises an identifier that uniquely identifies an individual member.

11. The method of claim 6, wherein the at least one invitee selection criterion comprises a list of identifiers, each of which uniquely identifies an individual member.

* * * * *

UNITED STATES PATENT AND TRADEMARK OFFICE
CERTIFICATE OF CORRECTION

PATENT NO. : 8,655,672 B2
APPLICATION NO. : 10/734811
DATED : February 18, 2014
INVENTOR(S) : Bhan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
Twentieth Day of October, 2015

Michelle K. Lee
*Director of the United States Patent and Trademark Office*